United States Patent [19]
Regnier et al.

[11] 3,802,777
[45] Apr. 9, 1974

[54] GAS CONCENTRATION MEASUREMENT DEVICE USING STIMULATED RAMAN SCATTERING

[75] Inventors: Pierre R. Regnier, Arcrueil; Jean-Pierre E. Taran, Bues-paw-yvette, both of France

[73] Assignee: Office National D'Etudes Et De Recherches Aerospatiales, Chatillon, France

[22] Filed: Apr. 17, 1973

[21] Appl. No.: 351,969

[30] Foreign Application Priority Data
- Apr. 19, 1972 France .......................... 72.13812
- Apr. 17, 1973 France .......................... 73.14007

[52] U.S. Cl. ................................. 356/75, 356/85
[51] Int. Cl. ........................................ G01j 3/44
[58] Field of Search ........................... 356/75, 85

[56] References Cited
OTHER PUBLICATIONS

"High–Speed Spectroscopy Using the Inverse Raman Effect"; Mc Laren et al.; Applied Physics Letters; Vol. 16 No. 3; 1 Feb. 1970; pp. 140 & 141.

Primary Examiner—Ronald L. Wilbert
Assistant Examiner—V. P. McGraw

[57] ABSTRACT

Device for detecting a given molecular gas, measuring its concentration and visualizing its concentration pattern in an aerodynamic flow, a flame, or in the atmosphere. A laser beam and a Stokes beam having frequencies differing by the vibrational frequency of the gas are sent parallel or focussed onto a sample of the gas by means of an optical system. An anti-Stokes beam is thus produced which depends on the concentration of the gas at the focus of the optical means and this beam is imaged on any convenient displaying means. The optical system has a varying focal length which allows the plotting point by point of the gas concentration within a sample volume.

5 Claims, 7 Drawing Figures

GAS CONCENTRATION MEASUREMENT DEVICE USING STIMULATED RAMAN SCATTERING

The present invention concerns a process and a device for gas concentration measurements in flames, aerodynamic flows and in the atmosphere, using a stimulated Raman scattering process, more particularly using a four photon scattering process by which two quanta at a laser frequency scatter into a quantum at the Stokes frequency and a quantum at the antiStokes frequency.

An object of the invention is to provide means for direct single shot visualization of flames and aerodynamic flows.

Another object of the invention is to provide means for scanning the concentration of a gaseous component in a gas mixture sample along paths in said sample. For example, the concentration profile of $H_2$ in a natural gas flame can be plotted versus the distance from the longitudinal axis of the flame and the distance from the outlet of the burner. Another application is the remote probing of atmospheric constituents above 100 kms, at ranges extending from a few kms to 100 kms and from an orbiting station.

The laser and Stokes light beams can either be sent parallel into the flow to be photographed in which case the flow is imaged onto the plane of the photographic plate by means of a lens or they can be focussed into the sample to analyze. For beam intensities of the order of 1 MW/cm² traversing a 1-cm thick sample of 10 percent $H_2$ in air, the antiStokes intensity is of about 1 mW/cm². This intensity is sufficient for directly exposing a high speed photographic plate during a laser pulse of 20 ns duration. Considerable enhancement of the antiStokes beam intensity can further be obtained by merely focussing the pump beams.

It is to be reminded that, in a non dispersive medium, an electric field of frequency $\nu$, a light electric field for example, complies with the Maxwell's law $$\delta^2 E/\delta x^2 - (1/C^2) \delta^2 D/\delta t^2 = 0 \quad (1)$$

where $E$ is the light electric field which may be written:

$$E = (\tfrac{1}{2}) \epsilon(x,t) \exp i(kx - \omega t) + \text{the complex conjugate term} \quad (2)$$

with
$\omega = 2\pi\nu$
$k = (\omega/c) \sqrt{\epsilon}$
$\epsilon$ = amplitude of the field
$\epsilon$ = permittivity of the medium ($\epsilon \approx 1$ for gases)

The displacement $D$ can be split into a linear component and a nonlinear component:

$$D = \epsilon E + 4\pi P_{NL}$$

where $P_{NL}$ is the induced electric polarization third order in the electric field strength. $D$ and $P_{NL}$ can be expressed by equations similar to equation (2).

In the case of stimulated Raman scattering, the nonlinear polarization can be expressed as follows:

$$P_{NL} = \chi^{(3)} (\Sigma E_i)^3$$

where $\chi^{(3)}$ is the third order susceptibility and the $E_i$ are the electric fields simultaneously present in the medium.

Let us now consider a laser field of amplitude $\epsilon_L$ and angular frequency $\omega_L$ and a Stokes field of amplitude $\epsilon_S$ and angular frequency $\omega_S$. If the gas whose concentration is to be measured has Raman active molecules resonant at angular frequency $\omega_v$ and if the angular frequencies $\omega_L$ and $\omega_S$ are selected such that $$\omega_L - \omega_S = \omega_v$$

the susceptibility $\chi^{(3)}$ takes a larger value. Among the polarization terms, there appears an antiStokes term having an angular frequency $\omega_{aS}$ such that:

$$\omega_{aS} = \omega_L + \omega_v = 2\omega_L - \omega_S$$

and which can be written $P^{aS}_{NL} = \tfrac{1}{8} \chi^{(3)} \epsilon^2_L \epsilon^*_S \exp i [(2k_L - k_S) x - \omega_{aS} t]$
+ the complex conjugated term.

The antiStokes field wave complies with equation (1) and it can be expressed as follows (neglecting the backward wave):

$$(\delta/\delta x) \epsilon_{aS} = (\pi\omega_{aS}/2ic) \chi^{(3)} \epsilon^2_L \epsilon^*_S e^{i \Delta k.x} \quad (3)$$

with
$\Delta k = k_{aS} - 2k_L + k_S$

The phase dependent term $e^{i \Delta k.x}$ becomes equal to unity when $\Delta k.x = \Delta k.D = \pi$ which defines a coherence length $D$. For a molecular gas under standard temperature and pressure conditions, $D$ is equal to several tens of centimeters; in fact, in most of the practical cases, the length of the samples to be analyzed is smaller than $D$. It results that the phase dependent term can be assumed equal to unity and that equation (3) can be simplified to:

$$(\delta/\delta x) \epsilon_{aS} = (\pi\omega_{aS}/2ic) \chi^{(3)} \epsilon^2_L \epsilon^*_S$$

in the case where the fields are quasi-steady state fields, i.e. in the case where:

$$\delta\epsilon/\delta t \ll \omega\epsilon$$

In the stimulated Raman scattering process used in the invention, interaction is weak and therefore no significant depletion of the pumping waves at angular frequencies $\omega_L$ and $\omega_S$ occurs. The amplitudes $\epsilon_L$ and $\epsilon_S$ can therefore be considered as substantially constant. The susceptibility $\chi^{(3)}$ at resonance is pure imaginary and it is proportional to the concentration per volume unit $n$ of the resonant moles and inversely proportional to the width of the Raman ray $\Delta\nu$. The Raman line width which is function of the temperature and pressure conditions is assumed to be known as well as the susceptibility $\chi^{(3)}$ of the gas sought for and its vibrational angular frequency $\omega_v$. In the case of a gas mixture, the value of $\chi^{(3)}$ relative to a given component of the mixture is strictly proportional to the number of moles of said component per volume unit. For a gas sample having a length $x$ in the direction of the beams, the antiStokes wave amplitude is obtained by integrating equation (3):

$$\epsilon_{aS}(x) = \left[\frac{\pi\omega aS}{2ic} \frac{\chi^{(3)}(x)}{n(x)}\right] \epsilon^2_L \epsilon_S \int_0^x n(x)dx \quad (4)$$

By putting
$K = (\pi\omega_{aS}/2ic) \chi^{(3)}(x)/n(x)$
which does not depend on $x$ since $\chi^{(3)}(x)$ is proportional to $x$, the strength of the antiStokes wave $I_{aS}$ can be expressed as follows:

$$I_{aS} = \frac{c}{8\pi} \epsilon^2_{aS}(x) = \left(\frac{8\pi K}{c}\right)^2 I^2_L I_S \left[\int_0^x n(x)dx\right]^2 \quad (5)$$

where $I_L$ and $I_S$ are respectively the laser wave intensity and the Stokes wave intensity. According to equation (5), the intensity of the antiStokes wave is proportional to the square of the intensity of the laser wave, to the intensity of the Stokes wave and to the square of the total number of resonant moles met up with the pumping beams.

According to the principal feature of the invention, the laser beam and the Stokes beam are successively focussed by a variable focal length optical system to discrete points of a gas sample in order to measure the gas molar concentration at said points and derive therefrom the mole concentration pattern of the sample.

We shall now show that, by focussing the pumping beams to a given point of the gas sample, it is possible to make the intensity of the anti-stokes beam only depend on the gas concentration in a volume centered at the focus of the focussing optical system.

If the focussing system (see FIG. 1a) has a revolution symmetry the first diffraction circle has a diameter $$d = (4 \lambda/\pi B)f$$

where $f$ is the focal distance, $B$ the common diameter of the beams and $\lambda$ the mean value of the laser and Stokes wavelength. It can be assumed that the interaction volume has a diameter $d$ and a length $\Delta x$ limited by the planes on both sides of the focus in which the diameter of the beams is $d\sqrt{2}$. This length is equal to:

$$\Delta x = 8\lambda/\pi(f/B)^2$$

Assuming that this length is smaller than the coherence length and is small enough for $n$ being constant and $n(x)$ proportional to $x$, equation (3) becomes $$I_{aS} = (8\pi K/c)^2\, P^2_L\, I_S\, n^2(\Delta x)^2$$

The power issuing from the volume is $$P_{aS} = I_{aS} \times \pi d^2/4$$

$$P_{aS} \approx (8\pi K/c)^2\, (2/\lambda)^2\, P^2_L\, P_S\, n^2 \qquad (4)$$

where $P_L$ and $P_S$ are respectively the laser power and the Stokes power. It results from equation (4) that, within the approximations made, the antiStokes power is independent of the focal distance $f$ of the focussing beam and of the diameter of the beam.

By using a cylindrical lens instead of a circular lens as focussing system, it is possible to photograph a concentration distribution $n(y)$ along the direction of the lens width. In this case, the intensity of the antiStokes wave is given by the equation:

$$I_{aS} = (8\pi K/c)^2\, P^2_L\, P_S\, n^2(y)\, \pi f/\lambda B^4$$

$B$ is now the length of the side of the beams which is assumed to be square. $I_{aS}$ is no longer independent of $f$ and $B$ but the cylindrical focussing mode has the advantage of allowing a rectilinear distribution to be photographed.

Other features and advantages of the present invention will become apparent upon a perusal of the following specification taken in connection with the accompanying drawings wherein.

Figure 1A:
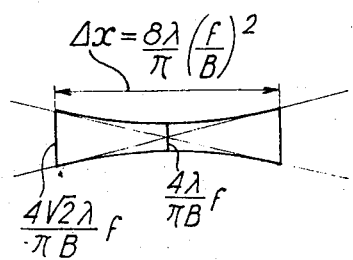
FIGS. 1a and 1b are schematic line diagrams of the interaction volume in the case where the laser and Stokes beams are focussed into the gas sample to analyze.
Figure 1B:
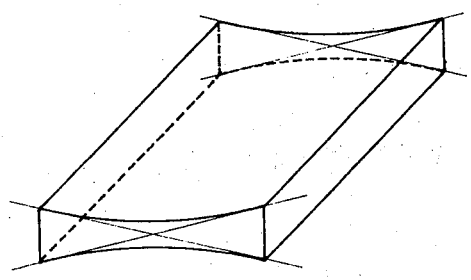
Figure 2:
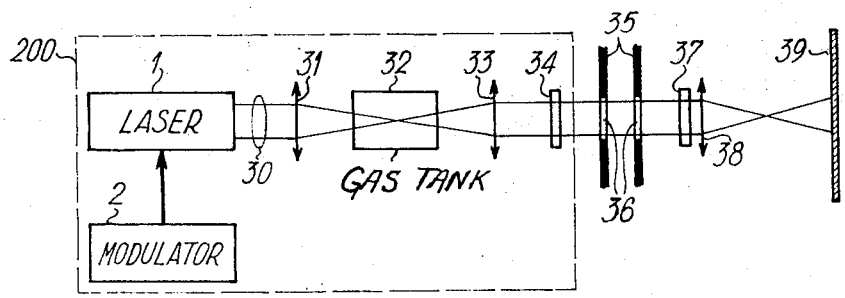
FIG. 2 shows a first embodiment of a gas concentration measurement device in which the beams are sent parallel into a flow to be photographed.

Referring now to FIG. 2, 1 is a Q switched ruby laser triggered by a modulator 2 and operating in a single transverse mode, which produces a homogeneous Gaussian beam of sufficient intensity. The beam is focused by lens 31 into cell 32 filled with the gas to be detected in the flow. As they emerge from the cell, the laser beam and the Stokes beam generated along in the cell, are made parallel by lens 33 and traverse filter 34 which transmits them, but blocks or absorbs the light at angular frequency $\omega_{aS}$ which is also generated.

Reference numeral 35 stands for a wind tunnel and reference numeral 36 represents optical windows. Behind the exit window 36 one finds optical filter 37, transparent at $\omega_{aS}$ and opaque at $\omega_L$ and $\omega_S$, lens 38 and photographic plate 39. Lens 38 images a selected plane of the wind tunnel, perpendicular to the beam direction, onto the plane of photographic plate 39; this eliminates the effects of diffraction which can be produced on the antiStokes wave, by strong concentration or density gradients and restores a good optical imagery.

Figure 3:
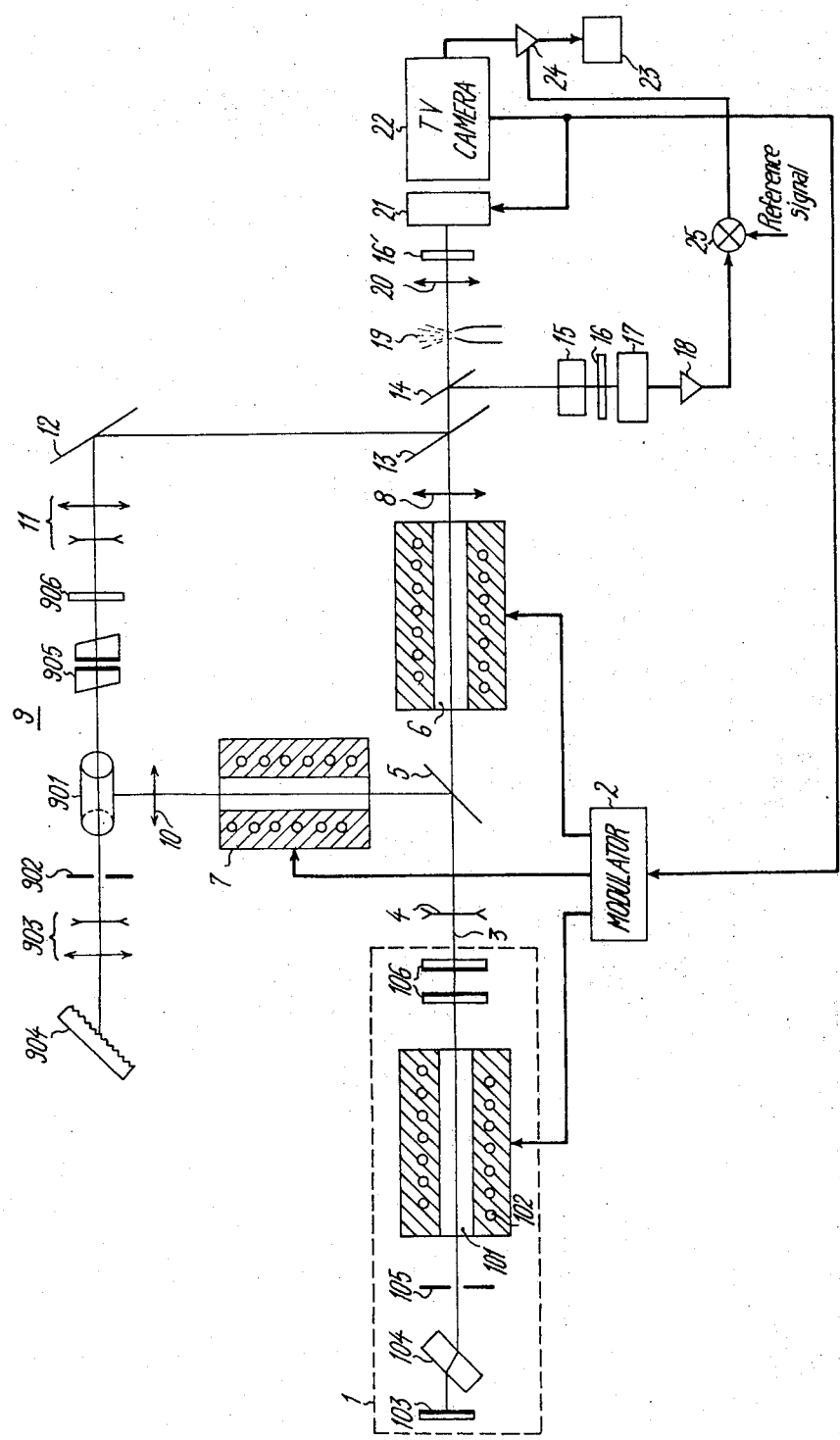
FIG. 3 shows a second embodiment of a gas concentration measurement device in which the beams are sent parallel into a flow to be visualized by means of an image tube.

Referring to FIG. 3, the IMW single mode ruby laser comprises a ruby 101 of 10 mm dia and 10 cm length, a flash lamp 102, a 100 percent reflecting mirror 103, a dye cell 104 filled with cryptocyanine in acetone, of 3 mm dia, a pinhole 105, a Fabry Perot output reflector 106 made up of two plane parallel E 8840 glass plates. Flash tube 102 is triggered by power modulator 2.

Beam 3 emitted by laser 1 traverses diverging lens 4 with 20 cm focal length, then beam splitter 5. Reference numerals 6 and 7 designate two 15 cm long ruby amplifiers. Following ruby amplifier 6 there is a converging lens 8 with 60 cms focal length which constitutes with lens 4 an afocal telescope of magnification 3. After traversing lens 8, the laser beam has a 1 cm diameter.

Following ruby amplifier 7, there is a 10 cm focal length cylindrical lens 10 which is, aligned parallel to the optical axis of dye laser referred to as a whole by 9. Lens 10 focuses the ruby laser beam into the dye cell of laser 9.

Dye laser 9 is composed of cell 901 filled with 1,1'-diethyl-4,4' quinotricarbocyanine iodide dissolved in acetone, 2 mm dia pinhole 902, afocal telescope 903 with a magnification of 5, 600 gr/mm grating 904, Fabry Perot selector 905 and output mirror 906. The combined action of grating 904 and interferometer 905 allows the wavelength tuning of dye laser 9 while maintaining the output spectral width below $10^{-1}$ cm$^{-1}$.

A focal telescope 11 adjusts the diameter of the output beam of laser 9 close to that of laser 1. The beams are made to overlap and rendered parallel within $10^{-4}$rd by the combined action of mirrors 12 and 13.

The coaxial laser beams are split into an active and a reference branch by means of beam splitter 14. The reference beams traverses cell 15 filled with a sample of the gas to detect, color and interference filter 16 which transmits the antiStokes radiation and blocks the laser beams, and impinges onto photomultiplier 17 followed by amplifier 18.

The active beams propagate through gas sample 19, (a flame in this instance), lens 20 and filter 16' identical to 16. Lens 9 images the sample onto the photocathode of image intensifier 21. A television camera 22 including a vidicon phototube is viewing the image formed on the screen of image intensifier 21 while its image scanning system is connected to video recorder 23 through amplifier 24.

The output signal from amplifier 18 on the reference arm is fed to a subtracting circuit 25 which receives, on its second input, a reference signal. The output signal from circuit 25 is connected to the gain control terminal of amplifier 24. One thus renders the measurement of the antiStokes intensity independent from the laser intensity fluctuations from shot to shot.

The TV camera time base triggers modulator 2 which itself powers the flashlamps on laser 1 and ruby amplifiers 6 and 7. The same time base also controls the power supply to the image intensifier 21 synchronously with the laser pulses. The image intensifier is therefore activated only to receive the laser pulses, which limits the production of noise to the TV camera to a short time period.

The operation of the system goes as follows:

A pulse from the time base controls simultaneously:

the energizing of the ruby laser;
the operation of the image intensifier; and
a single sweep on the vidicon photo-tube.

As triggered by this pulse and within 500 $\mu s$ the ruby laser produces a light pulse and an antiStokes image is formed onto the camera. The image is analyzed in a single sweep.

The video signals corresponding to the frame lines are recorded in a track in video tape of video recorder 23, together with identification pulse trains which are to permit a subsequent line by line identification.

Figure 4:
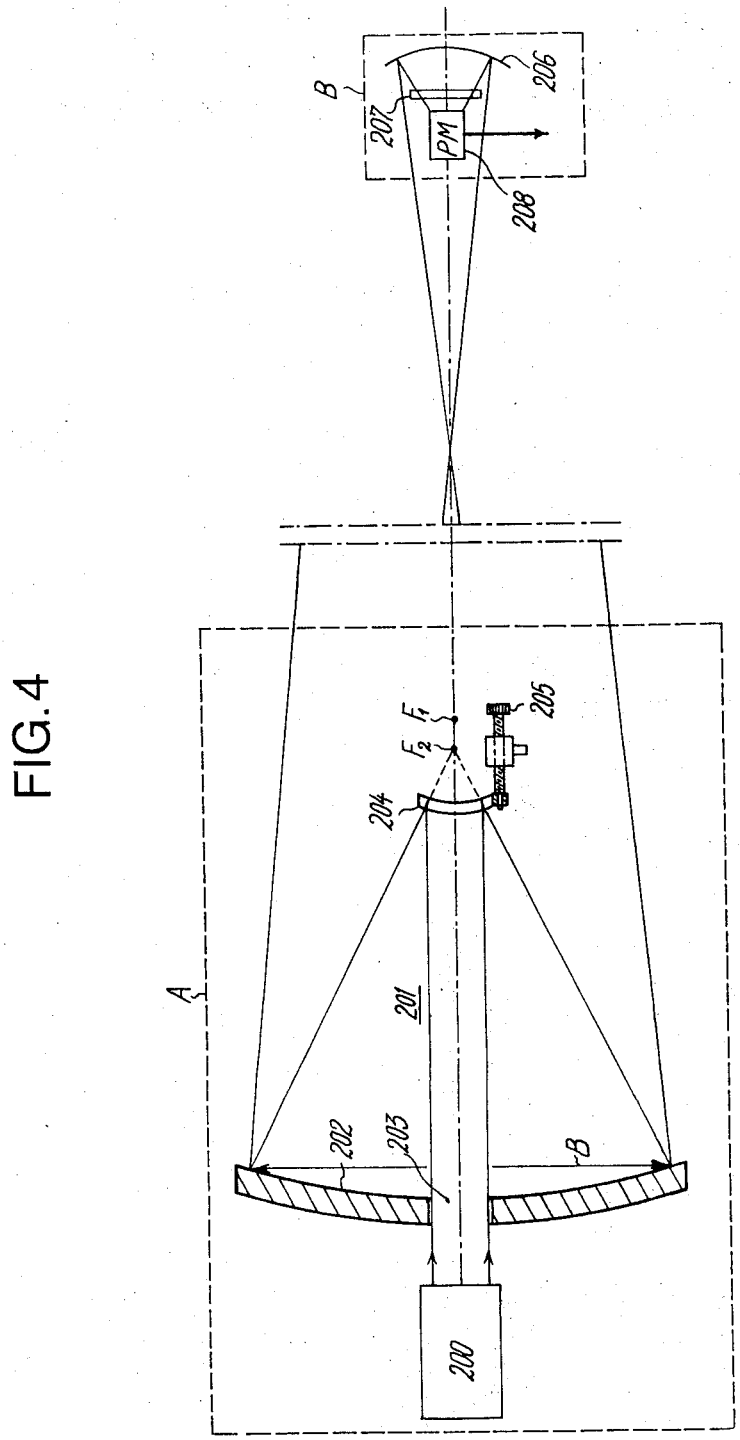
FIG. 4 shows a third embodiment of a gas concentration measurement device designed for probing an atmospheric constituent along the path connecting a transmitter and a receiver stations.

In FIG. 4, one finds a transmitter station A composed of elements 1, 2 and 31-34 taken from FIG. 2, represented by box 200, and which produce a laser beam, and a collinear Stokes beam. These beams are focused by means of Cassegrainian telescope referred to as a whole by number 201. This telescope is composed of concave parabolic mirror 202 with central aperture 203 for passage of the laser and Stokes beams, and of convex mirror 204. The position of the parabolic convex mirror is adjustable through micrometer 205.

In the experiments made by the applicants, the Cassegrainian telescope had the following characteristics:

incoming laser and Stokes beam diameter: 2 cm
aperture 1 m
focal length of concave mirror: 5 ms
surface of concave mirror: parabolic, $\lambda/10$
focal length of convex mirror: 10 cms
surface of convex mirror: parabolic, $\lambda/20$ The distance between the two foci $F_1$ and $F_2$ of both mirrors determines the focussing length $f$.

The table gives the values of the focal length $f$ and diameter $d$ of the diffraction limited focal spot as a function of $\alpha$

| $\alpha$ in mms | 25 | 2.5 | 0.25 |
|---|---|---|---|
| $f$ in kms | 1 | 10 | 100 |
| $d$ in mms | 0.7 | 7 | 70 |

The receiver station B comprises a spherical mirror 206 having a diameter of 1 m, a filter transparent for frequency $\omega_{as}$ including a color filter absorbing for the laser and Stokes radiations and an interference filter, and photomultiplier 208 located at the focus of the mirror. One can see that the values of $n(x)$ averaged over the above defined focal volumes, at various locations $x$ can be measured along the line from station A to station B.

In practice, mirror 206 must collect a large fraction of the antiStokes wave. This requirement puts a limit to the exploration of the values of $n(x)$ when distance AB is held fixed. One found that the central, one third long, portion of distance AB can be explored.

The applicants gives thereafter experimental results obtained with the equipment in FIG. 4, in order to give an idea of the precision in detecting molecular gases.

Figure 5:
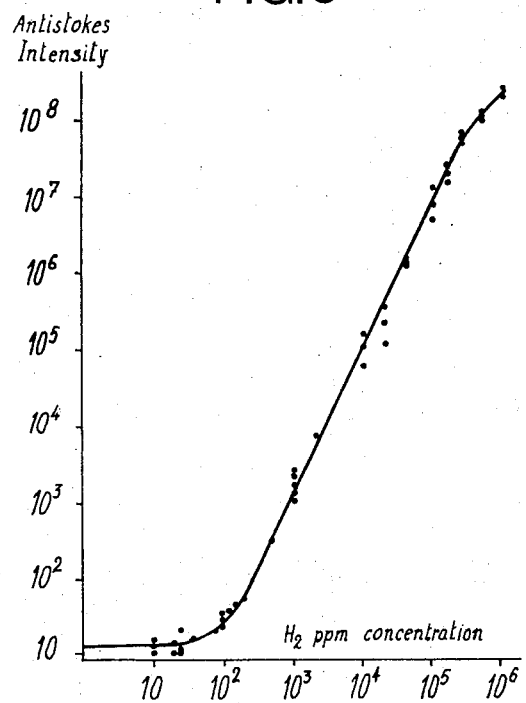
FIG. 5 is a plot of the intensity of the antiStokes wave versus the concentration of $H_2$ in ppm.

FIG. 5 is a plot of the normalized antiStokes power has as a function of the concentration $C_{H_2}$ of $H_2$ diluted in $N_2$ gas. The law in $C^2_{H_2}$ is obeyed, except at both ends:

On the high concentration end, two phenomena perturb the slope, namely line shifting and line broadening by collision of $H_2$ molecules with $N_2$ molecules (see P. Lallemand and P. Simova, J. Molecular Spectroscopy, 26, 262 (1968)).

On the low concentration end, the non resonant electronic susceptibility $\chi^{NR}$ (which was measured by W.G. Rado, Appl. Phys. Letters 11, 123 (1967)) produces a background signal which prevents measurements below 50 ppm of $H_2$.

Figure 6:
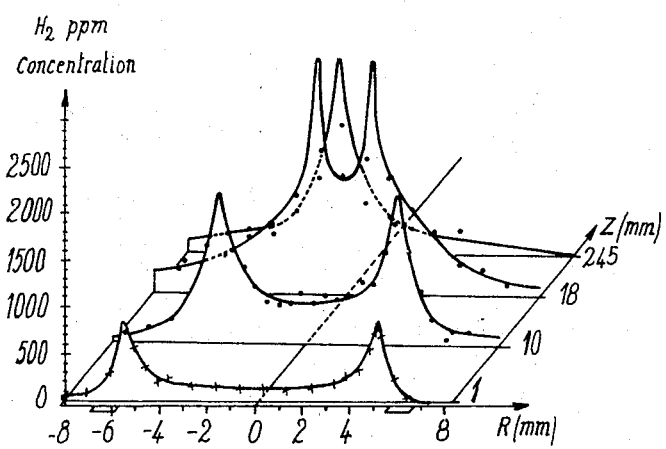
FIG. 6 is a pattern of a 100 to 1,000 ppm $H_2$ concentration distribution in a natural gas flame.

FIG. 6 gives the distribution of $H_2$ in a horizontal natural gas flame with a Bunsen burner. Z is the distance along the axis from the exit plane of the gas, while R is the distance from the axis. The signal are translated into concentrations of $H_2$ in $N_2$ under STP conditions.

When the scanning system of FIG. 4 is used, the distance $\alpha$ is transmitted by any available transmission channel from the transmitter station to the receiver station and the receiver station simultaneously records the value of n and the value of $\alpha$.

What we claim is:

1. Device for detecting a predetermined molecular gas and measuring and visualizing the concentration pattern thereof, said gas having a given vibrational frequency, said device using a stimulated Raman scattering process and comprising a pulse laser transmitting a first coherent laser beam having a first frequency, means for transmitting a second coherent light beam colinear with said first beam and having a second frequency equal to the difference of said first frequency and said vibrational frequency, optical means for projecting said colinear first and second beams onto a sample of said molecular gas and focussing the said beams onto a selected region of said sample, whereby an antiStokes beam colinear with said first and second beams is generated in said sample, means for collecting said antiStokes beam from said sample selected region and means controlled by said collecting means for visualizing the concentration pattern of said molecular gas in said region.

2. Device for detecting a predetermined molecular gas and measuring and visualizing the concentration pattern thereof, said gas having a given vibrational frequency, said device using a stimulated Raman scattering process and comprising a pulse ruby laser transmitting a first coherent laser beam having a first frequency, a dye laser triggered synchronously with said ruby laser, transmitting a second coherent light beam colinear with said first beam and having a second frequency equal to the difference of said first frequency and said vibrational frequency, optical means for superimposing said first and second beams and projecting them onto a sample of said molecular gas and focussing the same beams onto a selected region of said sample, whereby an antiStokes beam colinear with said first and second beam is generated in said sample, means for collecting said antiStokes beam from said sample selected region and means controlled by said collecting means for visualizing the concentration pattern of said molecular gas in said region.

3. Device for detecting a predetermined molecular gas and measuring and visualizing the concentration pattern thereof, said gas having a given vibrational frequency, said device using a stimulated Raman scattering process and comprising a pulse laser transmitting a first coherent laser beam having a first frequency, a tank containing said predetermined molecular gas, first optical means for projecting said first beam onto said tank whereby a second coherent light beam colinear with said first beam and having a second frequency equal to the difference of said first frequency and said vibrational frequency is produced, second optical means for projecting said colinear first and second beams onto a sample of said molecular gas and focussing the said beams onto a selected region of said sample whereby an antiStokes beam colinear with said first and second beam is generated in said sample, means for collecting said antiStokes beam from said sample selected region and means controlled by said collecting means for visualizing the concentration pattern of said molecular gas in said region.

4. System for measuring the concentration of a molecular atmospheric gas along a rectilinear path between a transmitter station and a receiver station, said gas having a given vibrational frequency, said system using a stimulated Raman scattering process and comprising in the transmitter station a pulse laser transmitting towards said receiver station a first coherent laser beam having a first frequency, means for transmitting a second coherent light beam colinear with said first beam and having a second frequency equal to the difference of said first frequency and said vibrational frequency, variable focal length optical means for successively focussing said colinear first and second beams onto selected points of said path, means for varying the focal length of said optical means, whereby an antiStokes beam colinear with said first and second beams is successively generated in said atmospheric gas located at said points and in the receiver station means for collecting said antiStokes beam from said selected point and means controlled by said focal length varying means for measuring the concentration of said molecular gas at the different points of said path.

5. Device for visualizing the concentration of a molecular gas in an aerodynamic flow, said gas having a given vibrational frequency, said device using a stimulated Raman scattering process and comprising a pulse laser transmitting a first coherent laser beam having a first frequency, means for transmitting a second coherent light beam colinear with said first beam and having a second frequency equal to the difference of said first frequency and said vibrational frequency, a flow containing said molecular gas, first optical means for sending parallel into said flow said first and second beams, whereby an antiStokes beam colinear with said first and second beams is generated from said gas in said flow, a photographic plate, second optical means for projecting a selected plane of said gas in said flow onto said photographic plate and filtering means associated with said projecting optical means for blocking said first and second frequencies and passing the frequency of said antiStokes beam.

* * * * *